US012655899B2

(12) United States Patent
Zeiss et al.

(10) Patent No.: US 12,655,899 B2
(45) Date of Patent: Jun. 16, 2026

(54) TRANSMISSION ASSEMBLY FOR A VEHICLE

(71) Applicant: Schaeffler Technologies AG & Co. KG, Herzogenaurach (DE)

(72) Inventors: Tony Zeiss, Nuremberg (DE); Andreas Kinigadner, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 18/528,043

(22) Filed: Dec. 4, 2023

(65) Prior Publication Data

US 2025/0180105 A1     Jun. 5, 2025

(51) Int. Cl.
| | |
|---|---|
| *F16H 57/031* | (2012.01) |
| *B60K 17/12* | (2006.01) |
| *B60K 17/16* | (2006.01) |
| *F16H 57/02* | (2012.01) |

(Continued)

(52) U.S. Cl.
CPC ........... *F16H 57/031* (2013.01); *B60K 17/12* (2013.01); *B60K 17/165* (2013.01); *F16H 2057/02034* (2013.01); *F16H 2057/02043* (2013.01); *F16H 2057/02052* (2013.01); *F16H 2057/0216* (2013.01); *F16H 2057/0235* (2013.01)

(58) Field of Classification Search
CPC ............. F16H 37/0813; F16H 57/0037; F16H 57/021; F16H 57/023; F16H 57/031; F16H 57/037; F16H 2057/02034; F16H 2057/02043; F16H 2057/02052; F16H 2057/0216; F16H 2057/0235; B60K 17/165; B60K 2001/001

See application file for complete search history.

(56) References Cited

U.S. PATENT DOCUMENTS

| | | | |
|---|---|---|---|
| 11,965,560 B2 * | 4/2024 | Barthelme | ............ F16C 35/077 |
| 2022/0316582 A1 * | 10/2022 | Inoue | .................. F16H 57/0483 |
| 2024/0401679 A1 * | 12/2024 | Katayama | ........... F16H 57/0476 |

FOREIGN PATENT DOCUMENTS

| | | |
|---|---|---|
| DE | 202010001318 U1 | 5/2011 |
| EP | 3119625 A1 | 1/2017 |
| EP | 3837127 B1 | 4/2022 |

(Continued)

*Primary Examiner* — Joseph Brown
(74) *Attorney, Agent, or Firm* — Price Heneveld LLP

(57)     ABSTRACT

A transmission assembly for a vehicle includes a transmission housing, an intermediate bearing plate, a flange, and an intermediate shaft assembly. The transmission housing defines an interior region and includes a housing cover operable between closed and open positions. The intermediate bearing plate extends into the interior region and houses a first bearing. The flange houses a second bearing and is operable between mounted and removed conditions. In the mounted condition, the flange is mounted to the housing cover. The intermediate shaft assembly includes a first intermediate shaft that rotates within the first bearing and a second intermediate shaft that rotates within the second bearing. The second intermediate shaft is operable between engaged and disengaged conditions. In the engaged condition, the second intermediate shaft is engaged with the first intermediate shaft such that the first and second intermediate shafts are coaxial and rotate at a common rate.

12 Claims, 8 Drawing Sheets

(51) Int. Cl.
    *F16H 57/021*      (2012.01)
    *F16H 57/023*      (2012.01)

(56)             References Cited

FOREIGN PATENT DOCUMENTS

EP          3630503 B1   12/2022
WO    WO-2017182892 A1 *  10/2017   ......... F16H 57/0426

* cited by examiner

TRANSMISSION ASSEMBLY FOR A VEHICLE

FIELD OF THE DISCLOSURE

The present disclosure generally relates to a transmission assembly for a vehicle. More specifically, the present disclosure relates to a transmission assembly of an electric drive unit of a vehicle that includes an intermediate shaft having a first gear module and a second gear module that can be removed from the transmission assembly and replaced with another gear module to adjust the axle ratio of the vehicle.

BACKGROUND OF THE DISCLOSURE

Vehicles typically have fixed axle ratios. Changing the axle ratio of a vehicle often requires replacing components of the vehicle's transmission.

SUMMARY OF THE DISCLOSURE

According to a first aspect of the present disclosure, a vehicle includes a transmission housing, an intermediate bearing plate, an electric motor, an intermediate shaft assembly, a bearing housing, and a differential. The transmission housing includes a housing body and a housing cover that is operable between a closed position and an open position. In the closed position, the housing body and the housing cover cooperate to form an enclosure about an interior region of the transmission housing. In the open position, access to the interior region of the transmission housing is provided. The intermediate bearing plate extends into the interior region of the transmission housing. The intermediate bearing plate houses a first bearing. The electric motor drives rotation of a rotor shaft that extends into the interior region of the transmission housing. The intermediate shaft assembly includes a first gear module and a second gear module. The first gear module has a first intermediate shaft that is supported by the first bearing and operably coupled with the rotor shaft via a gear interface, such that rotation of the rotor shaft drives rotation of the first intermediate shaft. The second gear module has a second intermediate shaft that is operable between an engaged condition and a disengaged condition. In the engaged condition, the second intermediate shaft is engaged with the first intermediate shaft such that the first intermediate shaft and the second intermediate shaft are coaxial and configured to rotate at a common rate of rotation. In the disengaged condition, the second intermediate shaft is removed from the first intermediate shaft. The bearing housing is removably mounted to the transmission housing and has a second bearing housed therein that is configured to support and facilitate rotation of the second intermediate shaft. The bearing housing is operable between a mounted condition and a removed condition. In the mounted condition, the bearing housing is mounted to the transmission housing. In the removed condition, the bearing housing is removed from the transmission housing. The differential is disposed within the interior region of the transmission housing in the closed position of the housing cover and has a ring gear that interfaces with the second gear module in the engaged condition of the second gear module and the mounted condition of the bearing housing.

Embodiments of the first aspect of the disclosure can include any one or a combination of the following features:
  the ring gear includes a plurality of internal teeth that interface with the second gear module;

the bearing housing is removably mounted to the housing body of the transmission housing;
  a third bearing housed within the bearing housing and configured to support and facilitate rotation of a portion of the differential in the mounted condition of the bearing housing;
  the ring gear includes a plurality of external teeth that interface with the second gear module;
  the bearing housing is removably mounted to the housing cover of the transmission housing;
  the bearing housing comprises a flange that is bolted to an interior surface of the housing cover in the mounted condition;
  the intermediate bearing plate is integrally coupled with the transmission housing;
  the ring gear, the intermediate shaft assembly, and the rotor shaft are configured to rotate about respective parallel axes; and
  the ring gear is selectively coupled with the differential, such that the ring gear is operable to be removed from the transmission housing in the open position of the housing cover.

According to a second aspect of the present disclosure, a transmission assembly for a vehicle includes a transmission housing, an intermediate bearing plate, a flange, and an intermediate shaft assembly. The transmission housing defines an interior region and includes a housing cover that is operable between a closed position and an open position. In the open position, access to the interior region is provided. The intermediate bearing plate extends into the interior region and houses a first bearing. The flange houses a second bearing and is operable between a mounted condition and a removed condition. In the mounted condition, the flange is mounted to the housing cover. In the removed condition, the flange is removed from the housing cover. The intermediate shaft assembly includes a first intermediate shaft that is supported by and rotates within the first bearing and a second intermediate shaft that is supported by and rotates within the second bearing. The second intermediate shaft is operable between an engaged condition and a disengaged condition. In the engaged condition, the second intermediate shaft is engaged with the first intermediate shaft such that the first intermediate shaft and the second intermediate shaft are coaxial and configured to rotate at a common rate of rotation. In the disengaged condition, the second intermediate shaft is removed from the first intermediate shaft.

Embodiments of the second aspect of the disclosure can include any one or a combination of the following features:
  a differential having a ring gear that is operably coupled with the second intermediate shaft in the engaged condition of the second intermediate shaft and the mounted condition of the flange, such that the rotation of the second intermediate shaft drives rotation of the ring gear;
  the ring gear is selectively coupled with the differential, such that the ring gear is operable to be removed from the transmission housing in the open position of the housing cover;
  the ring gear and the intermediate shaft assembly are configured to rotate about respective parallel axes;
  the flange is bolted to an interior surface of the housing cover in the mounted condition; and
  the intermediate bearing plate is integrally coupled with the transmission housing.

According to a third aspect of the present disclosure, a transmission assembly for a vehicle includes transmission housing, an intermediate bearing plate, a bearing housing, an intermediate shaft assembly, and a differential. The transmission housing defines an interior region and includes a housing cover operable between a closed position and an open position. In the open position, access to the interior region is provided. The intermediate bearing plate extends into the interior region and houses a first bearing. The bearing housing houses a second bearing and a third bearing and is operable between a mounted condition and a removed condition. In the mounted condition, the bearing housing is mounted to the transmission housing. In the removed condition, the bearing housing is removed from the transmission housing. The intermediate shaft assembly includes a first intermediate shaft that is supported by and rotates within the first bearing and a second intermediate shaft that is supported by and rotates within the second bearing. The second intermediate shaft is operable between an engaged condition and a disengaged condition. In the engaged condition, the second intermediate shaft is engaged with the first intermediate shaft such that the first intermediate shaft and the second intermediate shaft are coaxial and configured to rotate at a common rate of rotation. In the disengaged condition, the second intermediate shaft is removed from the first intermediate shaft. The differential has a ring gear that interfaces with the a gear coupled to the second intermediate shaft in the engaged condition of the second intermediate shaft and the mounted condition of the bearing housing, such that rotation of the second intermediate shaft drives rotation of the ring gear. The third bearing facilitates rotation of a portion of the differential.

Embodiments of the third aspect of the disclosure can include any one or a combination of the following features:

the ring gear includes a plurality of internal teeth that interface with the gear coupled to the second intermediate shaft;

the ring gear and the intermediate shaft assembly are configured to rotate about respective parallel axes; and the intermediate bearing plate is integrally coupled with the transmission housing.

These and other features, advantages, and objects of the present disclosure will be further understood and appreciated by those skilled in the art by reference to the following specification, claims, and appended drawings.

Figure 1:
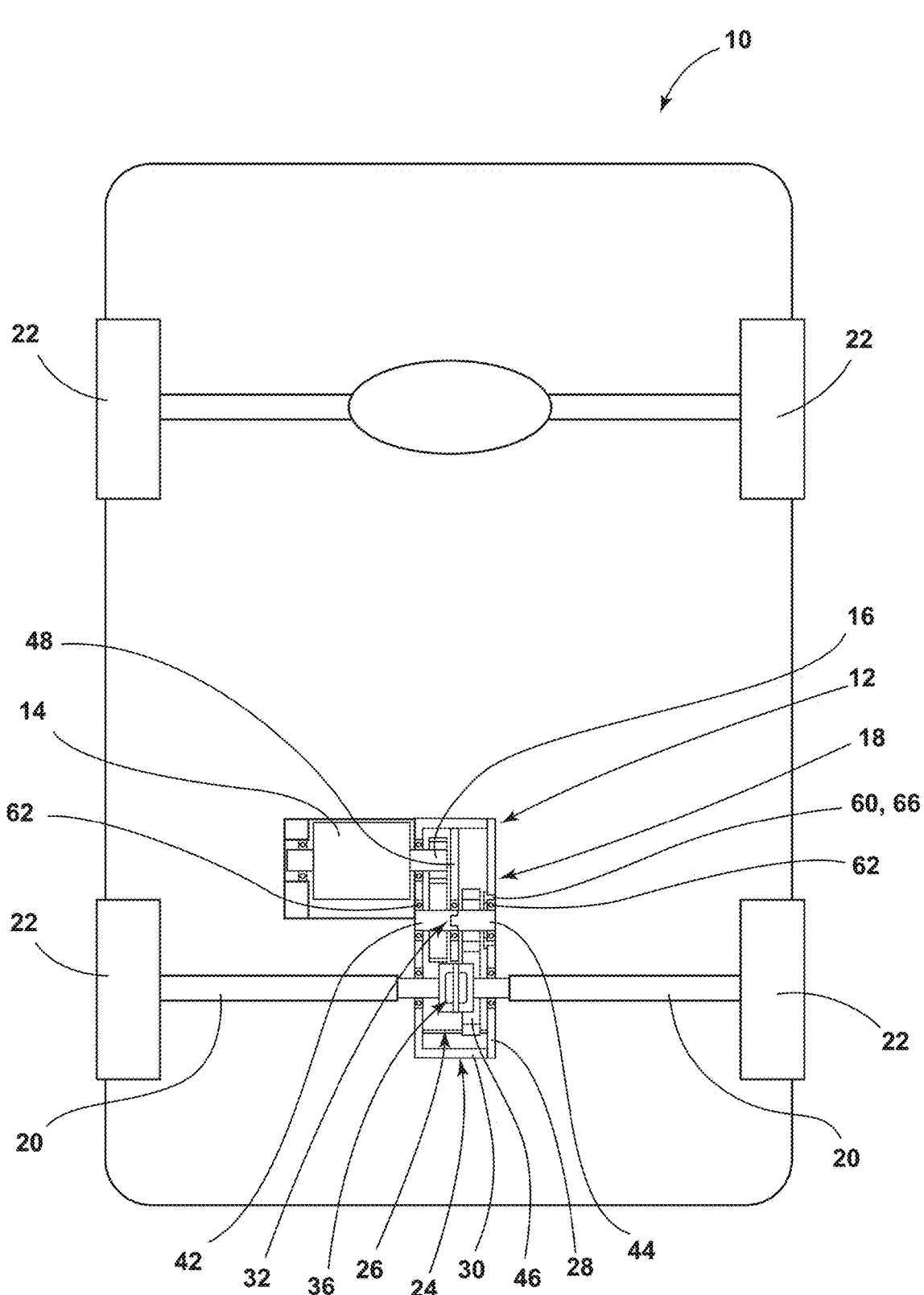
FIG. 1 is a schematic view of a vehicle that includes an electric drive unit that has an electric motor and a transmission assembly.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of an object configured to rotate in operation of the apparatus described herein. The term "coaxial" shall be understood to refer to rotatable about a common axis. Further, the term "radial" and derivatives thereof, such as "radially," shall be understood in relation to the axis of the aforementioned object. For example, "radially outboard" refers to further away from the axis, while "radially inboard" refers to nearer to the axis.

Referring now to FIG. 1, a vehicle 10 is illustrated. The vehicle 10 includes an electric drive unit 12 for propelling the vehicle 10. The electric drive unit 12 includes an electric motor 14. The electric motor 14 may include a stator and a rotor (not shown) and may be configured to drive a rotor shaft 16. The electric drive unit 12 further includes a transmission assembly 18 that transmits the rotation of the rotor shaft 16 into rotation of output shafts 20 (e.g., half shafts) that are operably coupled with wheels 22 of the vehicle 10, as illustrated in FIG. 1.

Figure 2:
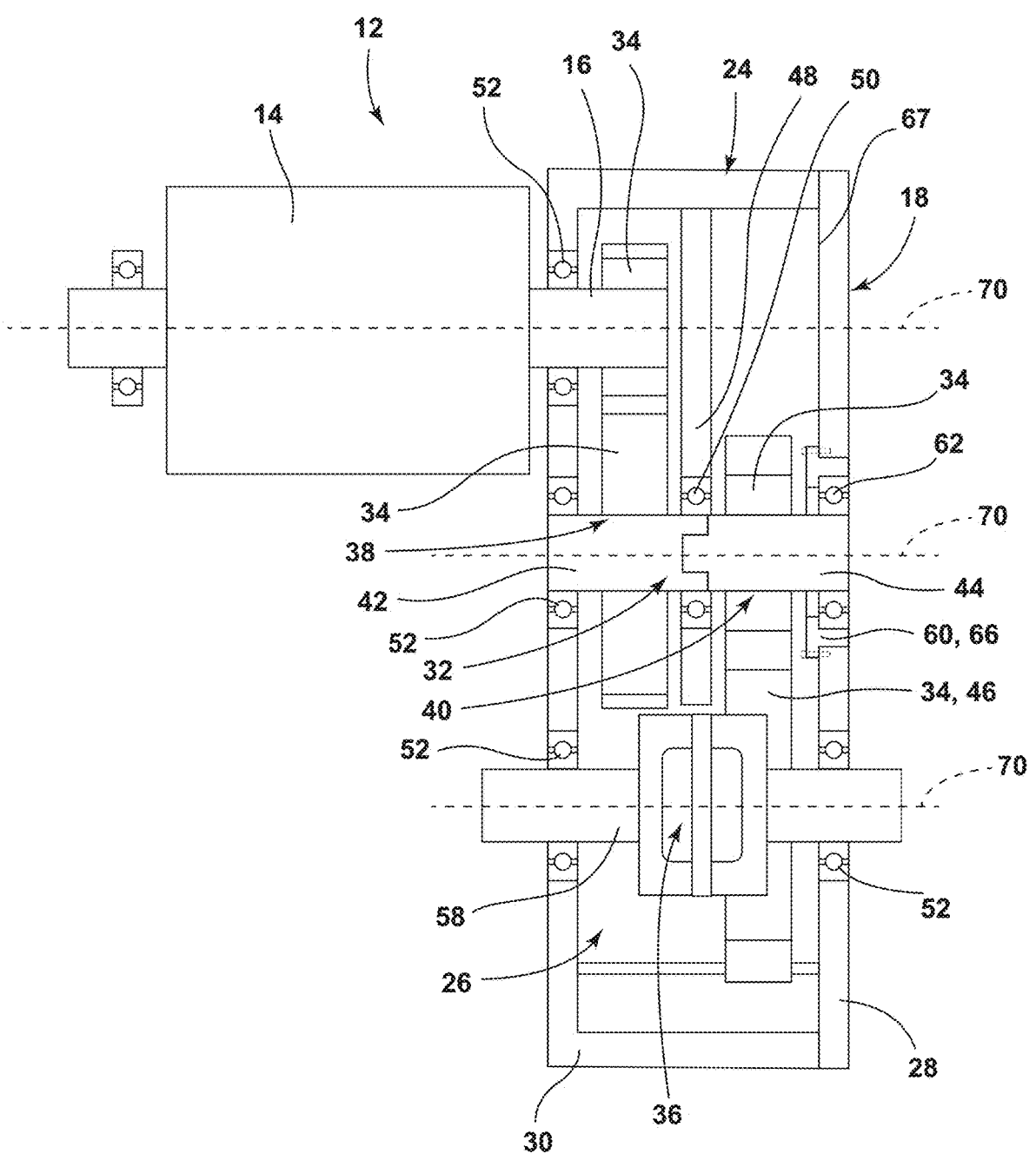
FIG. 2 is a cross-sectional view of an electric drive unit illustrating an electric motor, and a transmission assembly that includes an intermediate shaft assembly and a differential disposed within a transmission housing.
Figure 3:
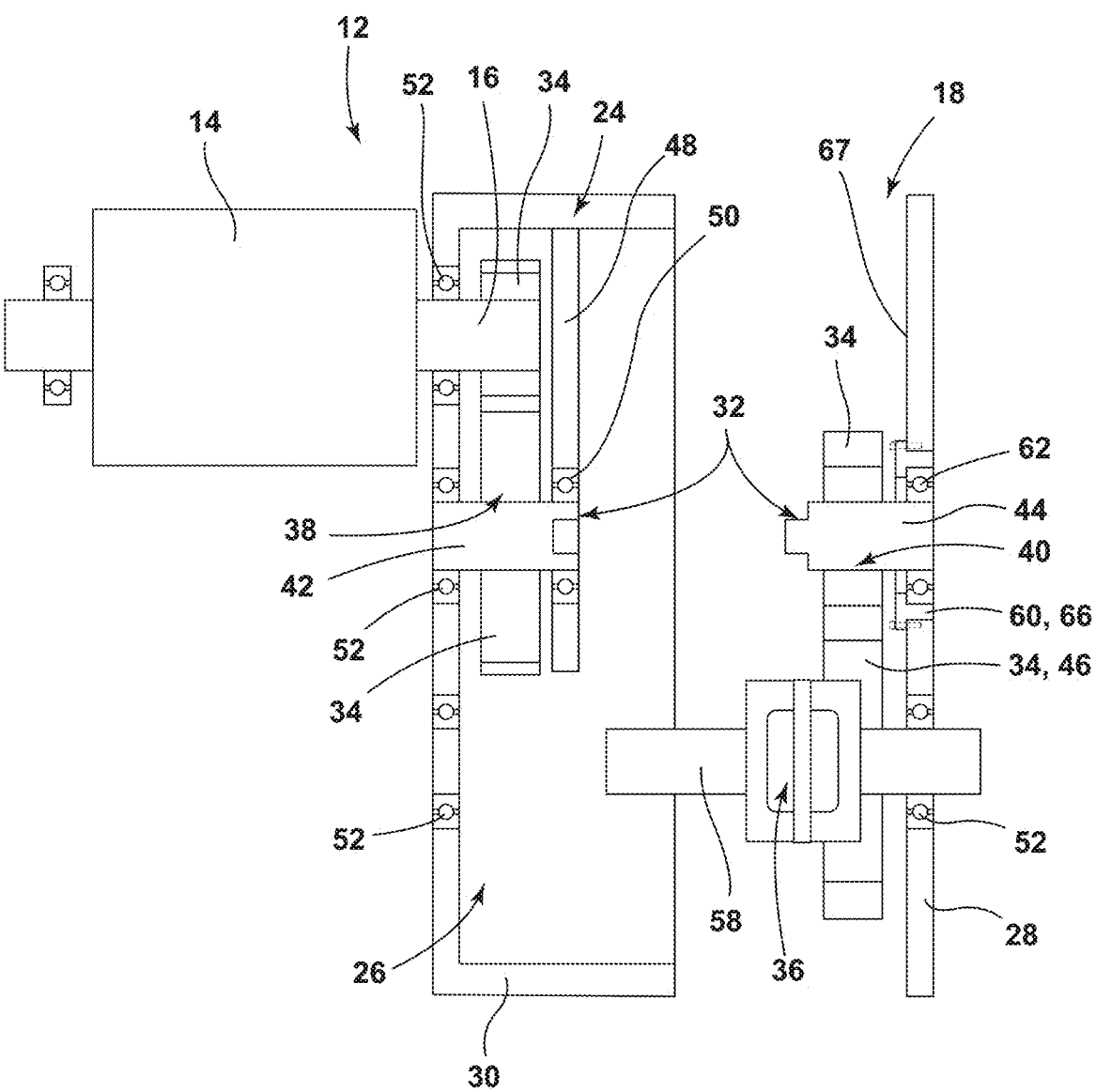
FIG. 3 is a cross-sectional view of the electric drive unit illustrating a housing cover of the transmission housing in an open position and a second gear module of the intermediate shaft assembly in a disengaged condition, wherein the second gear module is disengaged from a first gear module of the intermediate shaft assembly.

Referring now to FIGS. 1-3, the transmission assembly 18 includes a transmission housing 24. The transmission housing 24 defines an interior region 26 that houses a variety of components of the transmission assembly 18, as described further herein. The transmission housing 24 includes a housing cover 28. The housing cover 28 is operable between an open position and a closed position. In the open position, access to the interior region 26 of the transmission housing 24 is provided. In the closed position, the housing cover 28 and other portions of the transmission housing 24 cooperate to form an enclosure about the interior region 26 of the transmission housing 24. In various implementations, the transmission housing 24 includes a housing body 30 and the housing cover 28. For example, as illustrated in FIGS. 2 and 3, the transmission housing 24 includes the housing body 30 and the housing cover 28 that is operable between the closed position, as illustrated in FIG. 2, wherein the housing body 30 and the housing cover 28 cooperate to form an enclosure about the interior region 26 of the transmission housing 24, and an open position, as illustrated in FIG. 3, wherein access to the interior region 26 of the transmission housing 24 is provided. In the embodiment illustrated in FIGS. 2 and 3, the housing cover 28 is mounted to the housing body 30 in the closed position of the housing cover 28, as illustrated in FIG. 2, and is removed from the housing body 30 in the open position of the housing cover 28, as illustrated in FIG. 3. As illustrated in FIGS. 2 and 3, the rotor shaft 16 that is driven by the electric motor 14 extends into the interior region 26 of the transmission housing 24.

Referring now to FIGS. 2-8, the transmission assembly 18 of the electric drive unit 12 includes an intermediate shaft assembly 32. The intermediate shaft assembly 32 is configured to interface with the rotor shaft 16 via gears 34, and interface with a differential 36 via gears 34, such that rotation of the rotor shaft 16 drives rotation of the intermediate shaft assembly 32, which, in turn, drives rotation of the differential 36, as described further herein. The intermediate shaft assembly 32 includes a first gear module 38 and a second gear module 40. The first gear module 38 includes a first intermediate shaft 42 and a gear 34 that is configured to interface with a corresponding gear 34 coupled to the rotor shaft 16. The second gear module 40 includes a second intermediate shaft 44 and a gear 34 coupled to the second intermediate shaft 44 that is configured to interface with a ring gear 46 of the differential 36, as described further herein. The second intermediate shaft 44 and the first intermediate shaft 42 are configured to be selectively engaged with each other. As illustrated in FIGS. 2 and 3, the second intermediate shaft 44 is operable between an engaged position, as illustrated in FIG. 2, and a disengaged condition, as illustrated in FIG. 3. In the engaged condition of the second intermediate shaft 44, the second intermediate shaft 44 is engaged with the first intermediate shaft 42 such that the first intermediate shaft 42 and the second intermediate shaft 44 are coaxial and are configured to rotate at a common rate of rotation. In the disengaged condition of the second intermediate shaft 44, the second intermediate shaft 44 is removed from the first intermediate shaft 42, as illustrated in FIG. 3. A variety of engagement mechanisms that allow for selective engagement between the first intermediate shaft 42 and the second intermediate shaft 44 are contemplated. For example, the first intermediate shaft 42 and the second intermediate shaft 44 may be selectively engaged via a spline.

Referring still to FIGS. 2-8, the transmission assembly 18 includes an intermediate bearing plate 48. The intermediate bearing plate 48 extends into the interior region 26 of the transmission housing 24, as illustrated in FIGS. 2 and 3. In various implementations, the intermediate bearing plate 48 is coupled to the transmission housing 24. As illustrated in FIGS. 2 and 3, the intermediate bearing plate 48 is coupled to the housing body 30 of the transmission housing 24 and extends into the interior region 26 of the transmission housing 24 therefrom. The intermediate bearing plate 48 can be coupled to the transmission housing 24 in a variety of manners. For example, in some implementations, the intermediate bearing plate 48 may be mounted to the transmission housing 24 via fasteners, such as bolts. In some implementations, the intermediate bearing plate 48 may be machined into a portion of the transmission housing 24, such as the housing body 30. As such, in some implementations, the intermediate bearing plate 48 may be integrally coupled with a portion of the transmission housing 24, such as the housing body 30.

The intermediate bearing plate 48 houses a first bearing 50. As illustrated in FIGS. 2-6, the first bearing 50 supports and facilitates rotation of the first intermediate shaft 42 of the intermediate shaft assembly 32. As illustrated in FIG. 2, the intermediate shaft assembly 32 is supported by bearings 52 that are seated within the transmission housing 24 proximate to opposite axial ends of the first and second intermediate shafts 42, 44 of the intermediate shaft assembly 32. The first bearing 50 that is housed within the intermediate bearing plate 48 is disposed axially between the aforementioned bearings 52 disposed proximate to the axial ends of the intermediate shaft assembly 32. The first bearing 50 being positioned in this way provides support for the axial end of the first intermediate shaft 42 that is configured to be engaged with the axial end of the second intermediate shaft 44 in the engaged condition of the second intermediate shaft 44. Accordingly, in the event that the second intermediate shaft 44 moves from the engaged condition to the disengaged condition, as illustrated in FIG. 3, the first intermediate shaft 42 is still supported by the first bearing 50.

Figure 4:
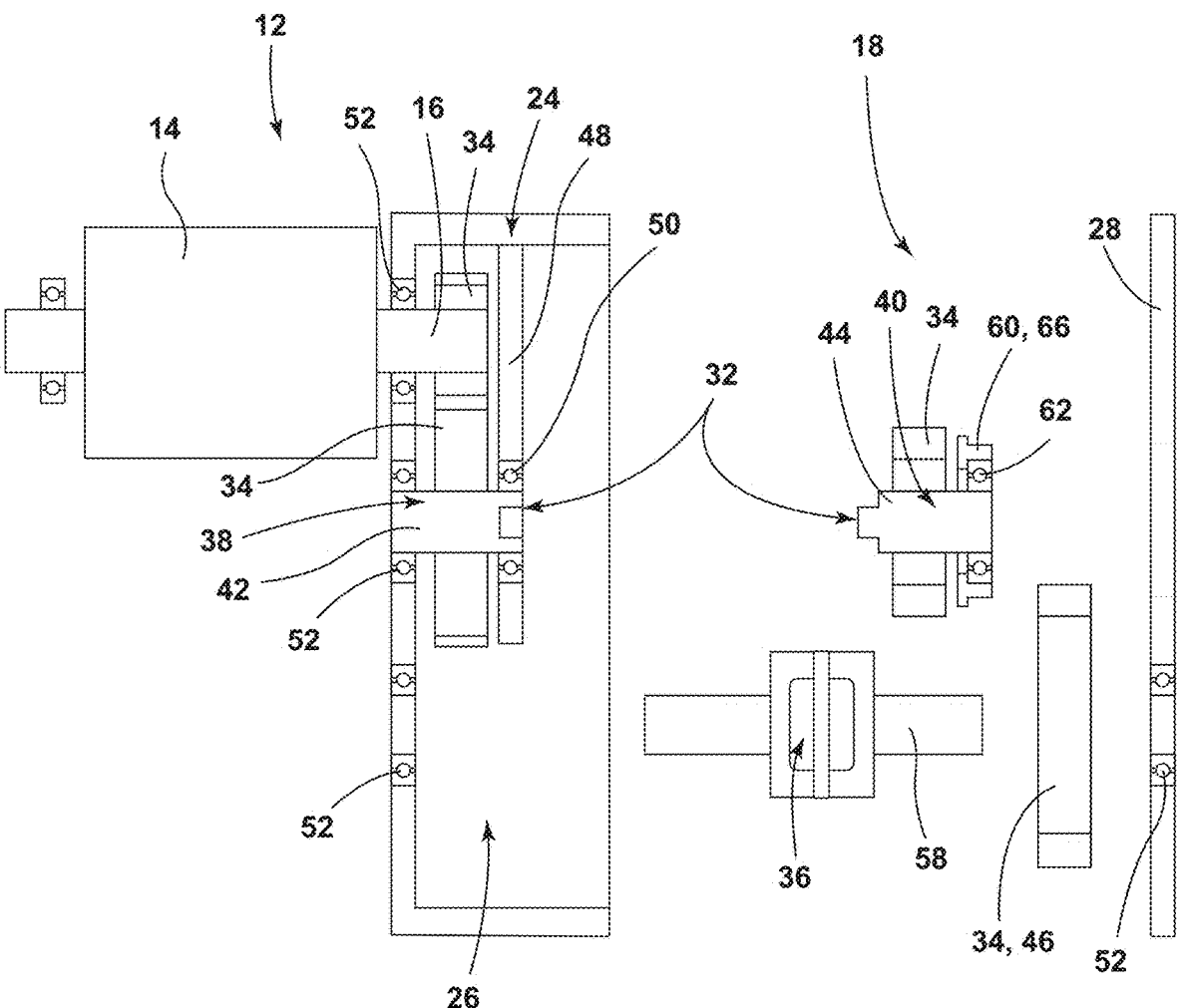
FIG. 4 is a cross-sectional view of the electric drive unit illustrating the housing cover in the open position, the second gear module in the disengaged condition, a bearing housing in a removed condition, and a ring gear of the differential removed from the differential.
Figure 5:
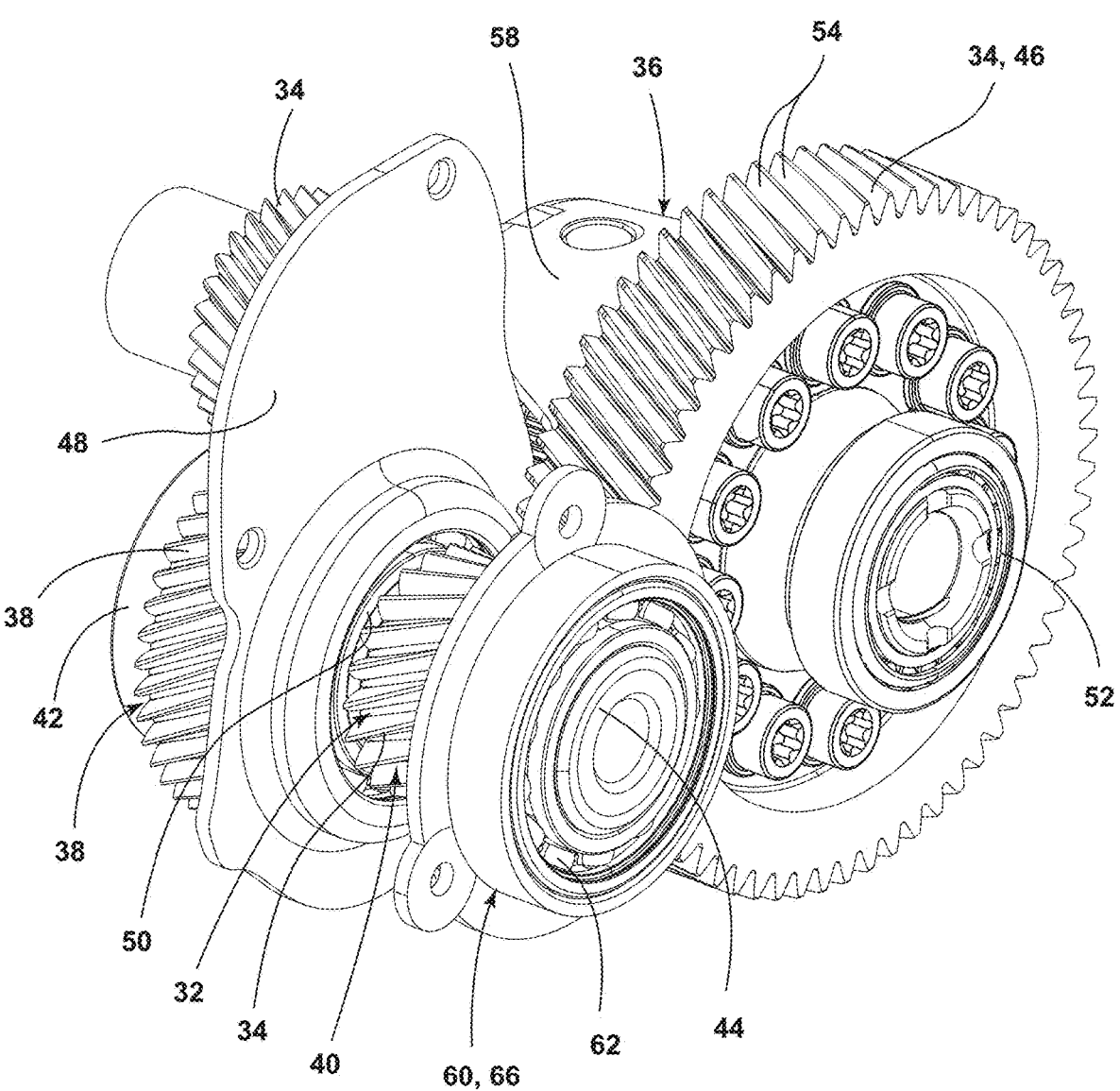
FIG. 5 is a perspective view of a differential, an intermediate shaft assembly that includes a first gear module and a second gear module, an intermediate bearing plate, and a bearing housing in the form of a flange.
Figure 6:
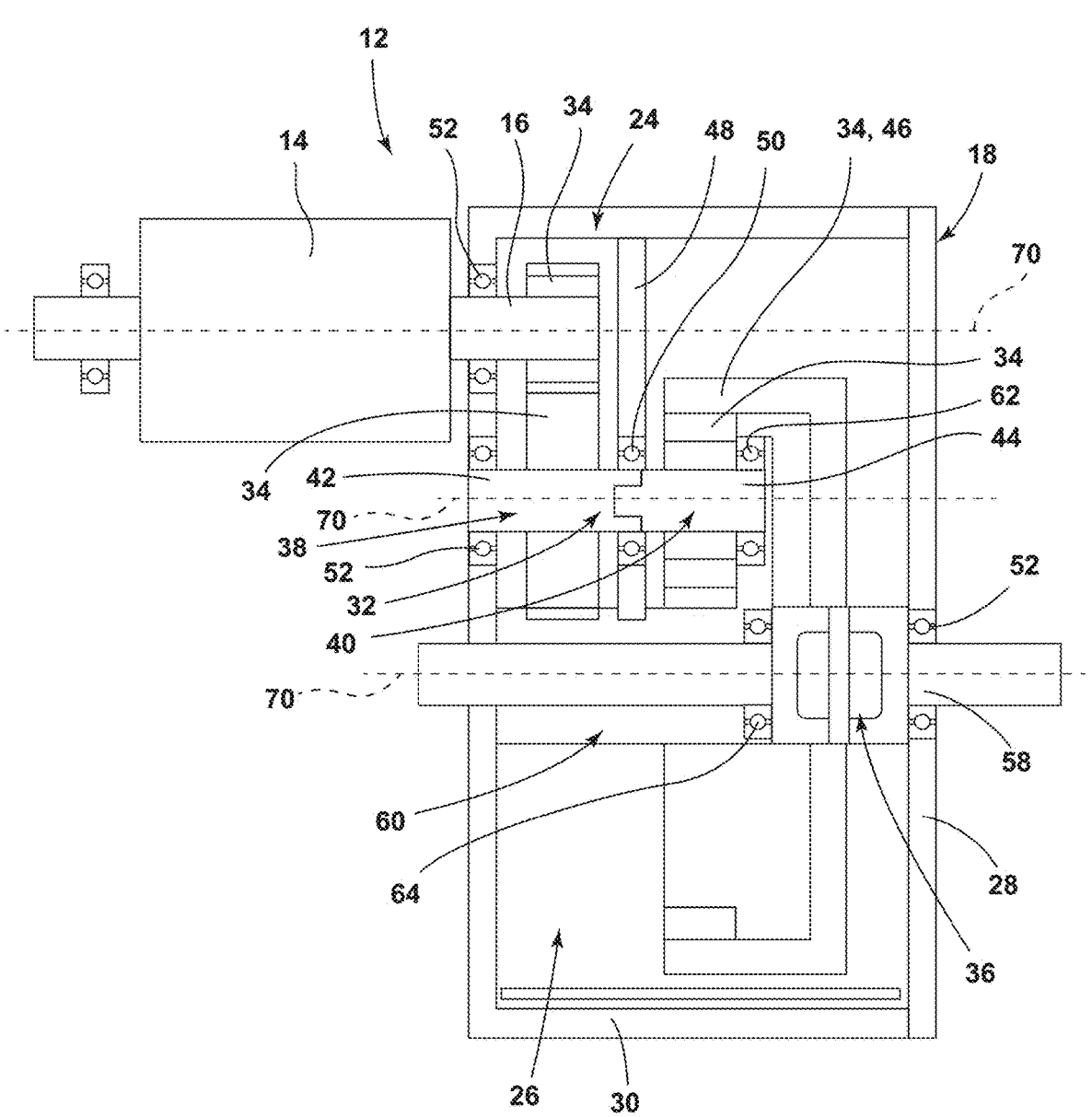
FIG. 6 is a cross-sectional view of an electric drive unit illustrating a transmission assembly that includes an intermediate shaft assembly, a differential, an intermediate bearing plate that houses a first bearing, and a bearing housing that houses second and third bearings.
Figure 7:
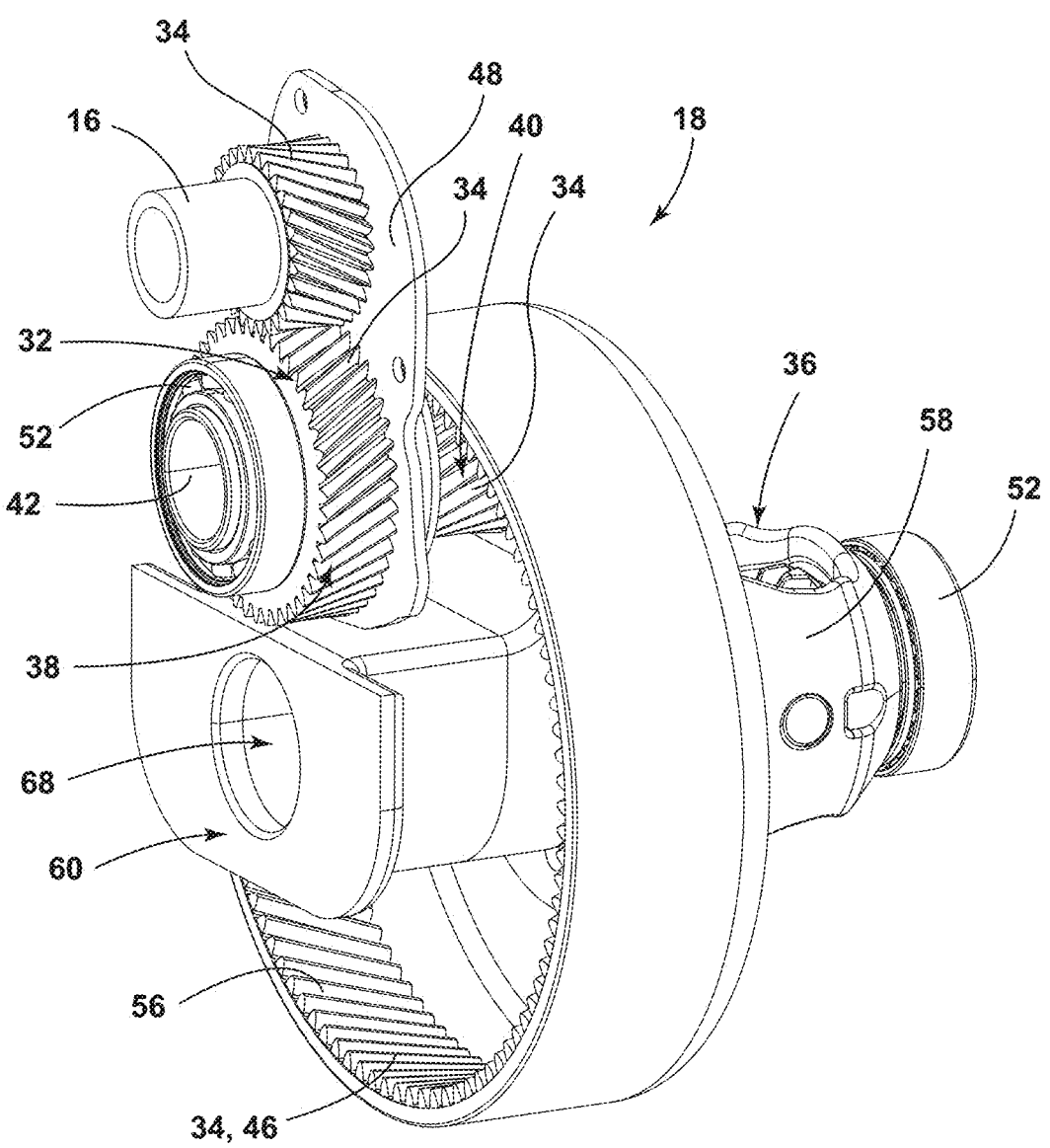
FIG. 7 is a perspective view of a rotor shaft, an intermediate shaft assembly, an intermediate bearing plate, a bearing housing, and a differential of a transmission assembly.
Figure 8:
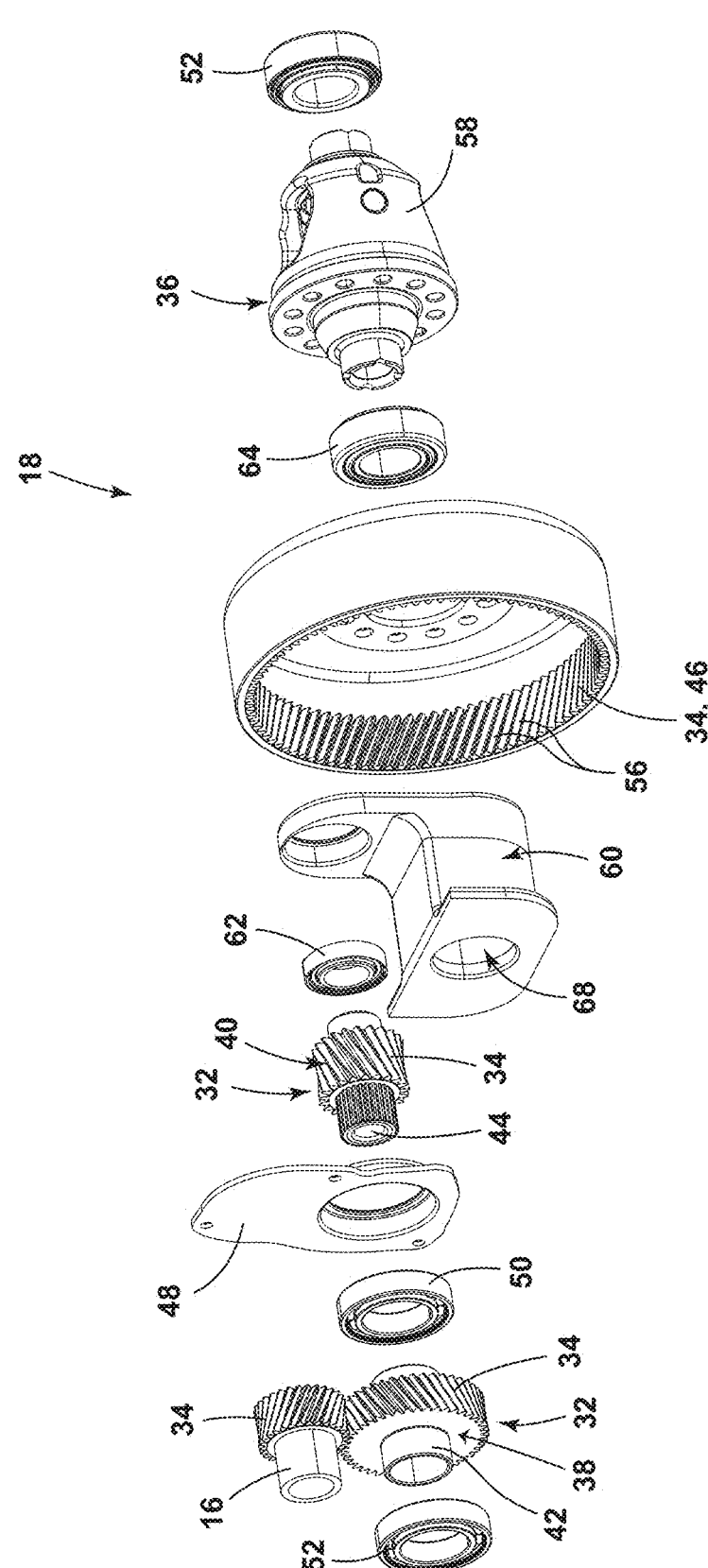
FIG. 8 is an exploded view of the components of the transmission assembly illustrated in FIG. 7.

Referring still to FIGS. 2-8, the transmission assembly 18 includes the differential 36. The differential 36 includes the ring gear 46. The ring gear 46 interfaces with the corresponding gear 34 of the second gear module 40, such that rotation of the intermediate shaft assembly 32 drives rotation of the ring gear 46. In some implementations, the ring gear 46 of the differential 36 includes a plurality of external teeth 54 that extend generally radially outward to terminal ends, as illustrated in FIG. 5. In such embodiments, the axis 70 about which the intermediate shaft assembly 32 rotates is positioned radially outboard of the ring gear 46 of the differential 36 with respect to the axis 70 about which the ring gear 46 is configured to rotate. In some implementations, the ring gear 46 of the differential 36 includes a plurality of internal teeth 56 that interface with the second gear module 40. For example, as illustrated in FIG. 7, the ring gear 46 includes a plurality of internal teeth 56 that extend radially inboard to terminal ends. In the illustrated embodiment, the axis 70 about which the intermediate shaft assembly 32 rotates is disposed radially inboard of the plurality of internal teeth 56 of the ring gear 46 of the differential 36 with respect to the axis 70 about which the ring gear 46 rotates. FIGS. 2-5 illustrate an embodiment of the ring gear 46 that includes external teeth 54, and FIGS. 6-8 illustrate an embodiment of the ring gear 46 that includes internal teeth 56.

Referring still to FIGS. 2-8, the ring gear 46 of the differential 36 may be selectively coupled with a portion of the differential 36. For example, as illustrated in FIGS. 4 and 8, the ring gear 46 is removed from a body 58 of the differential 36 that is configured to rotate with the ring gear 46 in the assembled condition of the differential 36. In various implementations, the ring gear 46 is selectively fastened to the body 58 of the differential 36 via fasteners, such as bolts. As described further herein, the ring gear 46 being selectively coupled with the body 58 of the differential 36 may allow for the ring gear 46 to be removed and replaced with another type of ring gear 46 for the purpose of adjusting the axle ratio of the transmission assembly 18.

Referring still to FIGS. 2-8, the transmission assembly 18 of the electric drive unit 12 of the vehicle 10 includes a bearing housing 60. The bearing housing 60 is configured to be coupled to the transmission housing 24 of the transmission assembly 18. In various implementations, the bearing housing 60 is removably mounted to the transmission housing 24, as described further herein. The bearing housing 60 houses a second bearing 62. The second bearing 62 supports and facilitates rotation of the second intermediate shaft 44 of the second gear module 40 of the intermediate shaft assembly 32. In some implementations, the bearing housing 60 houses the second bearing 62 that supports and facilitates rotation of the second intermediate shaft 44, and a third bearing 64 housed within the bearing housing 60 is configured to support and facilitate rotation of a portion of the differential 36, such as the differential body 58, as illustrated in FIG. 8.

In some embodiments, the bearing housing 60 is removably mounted to the transmission housing 24 and operable between a mounted condition, as illustrated exemplarily in FIGS. 2, 3, and 6, and a removed condition, as illustrated exemplarily in FIGS. 4 and 8. In the embodiment illustrated in FIGS. 2-5, the bearing housing 60 is a flange 66 that houses the second bearing 62 and that is operable between the mounted condition, wherein the flange 66 is mounted to the housing cover 28, as illustrated in FIGS. 2 and 3, and a removed condition, wherein the flange 66 is removed from the housing cover 28, as illustrated in FIG. 4. As shown in FIGS. 4 and 5, the second gear module 40, the flange 66, and the second bearing 62 can be a generally self-contained subassembly of the transmission assembly 18. As such, one such subassembly may be replaced with another such subassembly by a user to change the axle ratio of the transmission assembly 18. As illustrated in FIGS. 2 and 3, the flange 66 is bolted to an interior surface 67 of the housing cover 28 in the mounted condition of the flange 66.

In the embodiment illustrated in FIGS. 6-8, the bearing housing 60 houses the second bearing 62 and the third bearing 64. The bearing housing 60 is operable between the mounted condition, wherein the bearing housing 60 is mounted to the transmission housing 24, as illustrated in FIG. 6, and the removed condition, wherein the bearing housing 60 is removed from the transmission housing 24, as illustrated in FIG. 7. In some implementations, the bearing housing 60 defines an aperture 68 that extends through the bearing housing 60. The aperture 68 may be configured to receive an output shaft 20 (e.g., half shaft) therethrough in addition to housing the third bearing 64.

In an exemplary embodiment of the vehicle 10, the vehicle 10 includes the electric drive unit 12 that includes the transmission assembly 18. The rotor shaft 16 extends from the motor 14 of the electric drive unit 12 into the interior region 26 defined by the transmission housing 24 of the transmission assembly 18. The intermediate shaft assembly 32 interfaces with the rotor shaft 16 via corresponding gears 34, and the differential 36 interfaces with the intermediate shaft assembly 32 via corresponding gears 34, such that rotation of the rotor shaft 16 drives rotation of the intermediate shaft assembly 32, and rotation of the intermediate shaft assembly 32 drives rotation of the ring gear 46 of the differential 36. As illustrated in FIG. 2, the ring gear 46, the intermediate shaft assembly 32, and the rotor shaft 16 are configured to rotate about respective parallel axes 70 in operation of the vehicle 10.

In an exemplary implementation of the embodiment of the vehicle 10, a user, desiring to change the axle ratio of the vehicle 10, may first move the housing cover 28 from the closed position, as illustrated in FIG. 2, to the open position, as illustrated in FIG. 3, by removing the housing cover 28 from the housing body 30. As illustrated in FIG. 3, the second gear module 40 and the differential 36 move with the housing cover 28 as it is removed from the housing body 30. Next, the user removes the flange 66 from the housing cover 28 and unfastens the ring gear 46 of the differential 36 from the body 58 of the differential 36. The user then replaces the second gear module 40 and the ring gear 46 (or the differential 36 entirely) with replacement components that are sized to result in a different axle ratio.

The transmission assembly 18 of the vehicle 10 of the present disclosure may provide a variety of advantages. First, the modular nature of the transmission assembly 18 may allow for convenient replacement of parts within the interior region 26 of the transmission assembly 18 for customization of the axle ratio of the transmission assembly 18 and/or for replacement of worn components. Further, the modular nature may allow for switching of the type of transmission gears (e.g., bevel gear to limited slip, etc.). Second, the intermediate bearing plate 48 housing the first bearing 50 advantageously supports the first gear module 38 while the second gear module 40 is removed from the transmission assembly 18 and replaced.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 vehicle
12 electric drive unit
14 electric motor
16 rotor shaft
18 transmission assembly
20 output shaft/half shafts 22 wheels
24 transmission housing
26 interior region
28 housing cover
30 housing body
32 intermediate shaft assembly
34 gears
36 differential
38 first gear module
40 second gear module
42 first intermediate shaft
44 second intermediate shaft
46 ring gear
48 intermediate bearing plate
50 first bearing
52 bearings
54 external teeth
56 internal teeth
58 differential body/body of differential
60 bearing housing
62 second bearing
64 third bearing
66 flange
67 interior surface
68 aperture
70 axes

What is claimed is:

1. A vehicle, comprising:
a transmission housing, comprising:
  a housing body; and
  a housing cover that is operable between a closed position, wherein the housing body and the housing cover cooperate to form an enclosure about an interior region of the transmission housing, and an open position, wherein access to the interior region of the transmission housing is provided;
an intermediate bearing plate that extends into the interior region of the transmission housing, wherein the intermediate bearing plate houses a first bearing;
an electric motor that drives rotation of a rotor shaft that extends into the interior region of the transmission housing;
an intermediate shaft assembly, comprising:
  a first gear module having a first intermediate shaft that is supported by the first bearing and operably coupled with the rotor shaft via a gear interface, such that the rotation of the rotor shaft drives rotation of the first intermediate shaft; and
  a second gear module having a second intermediate shaft that is operable between an engaged condition, wherein the second intermediate shaft is engaged with the first intermediate shaft such that the first intermediate shaft and the second intermediate shaft are coaxial and configured to rotate at a common rate of rotation, and a disengaged condition, wherein the second intermediate shaft is removed from the first intermediate shaft, and wherein the first intermediate shaft is supported by the first bearing such that the first bearing supports the first intermediate shaft in the engaged condition of the second intermediate shaft and the disengaged condition of the second intermediate shaft;
a bearing housing removably mounted to the transmission housing and having a second bearing housed therein that is configured to support and facilitate rotation of the second intermediate shaft, the bearing housing being operable between a mounted condition, wherein the bearing housing is mounted to the transmission housing, and a removed condition, wherein the bearing housing is removed from the transmission housing; and
a differential disposed within the interior region of the transmission housing in the closed position of the housing cover and having a ring gear that interfaces with the second gear module in the engaged condition of the second gear module and the mounted condition of the bearing housing,
wherein a third bearing is coupled to the housing body, the first intermediate shaft being supported by and rotatable within the third bearing, and wherein the first bearing is disposed between the second bearing and the third bearing in the mounted condition of the bearing housing and the engaged condition of the second intermediate shaft.

2. The vehicle of claim 1, wherein the bearing housing is removably mounted to the housing body of the transmission housing.

3. The vehicle of claim 1, further comprising:
a fourth bearing housed within the bearing housing and configured to support and facilitate rotation of a portion of the differential in the mounted condition of the bearing housing.

4. The vehicle of claim 1, wherein the ring gear includes a plurality of external teeth that interface with the second gear module.

5. The vehicle of claim 1, wherein the bearing housing is removably mounted to the housing cover of the transmission housing.

6. The vehicle of claim 5, wherein the bearing housing comprises a flange that is bolted to an interior surface of the housing cover in the mounted condition.

7. The vehicle of claim 1, wherein the intermediate bearing plate is integrally coupled with the transmission housing.

8. The vehicle of claim 1, wherein the ring gear, the intermediate shaft assembly, and the rotor shaft are configured to rotate about respective parallel axes.

9. The vehicle of claim 1, wherein the ring gear is selectively coupled with the differential, such that the ring gear is operable to be removed from the transmission housing in the open position of the housing cover.

10. A transmission assembly for a vehicle, comprising:
a transmission housing that defines an interior region and includes a first end configured to receive a rotor shaft driven by a motor and a second end configured to receive a housing cover that is operable between a closed position and an open position, wherein access to the interior region is provided in the open position;
an intermediate bearing plate that extends into the interior region and houses a first bearing, the intermediate bearing plate being spaced from each of the first end of the transmission housing and the second end of the transmission housing;
a flange that houses a second bearing and is operable between a mounted condition, wherein the flange is mounted to the housing cover, and a removed condition, wherein the flange is removed from the housing cover;
an intermediate shaft assembly radially offset from the rotor shaft that is configured to drive rotation of the intermediate shaft assembly, the intermediate shaft assembly including a first intermediate shaft that is supported by and rotates within the first bearing and a second intermediate shaft that is supported by and rotates within the second bearing, the second intermediate shaft being operable between an engaged condition, wherein the second intermediate shaft is engaged with the first intermediate shaft such that the first intermediate shaft and the second intermediate shaft are coaxial and configured to rotate at a common rate of rotation, and a disengaged condition, wherein the second intermediate shaft is removed from the first intermediate shaft; and a differential having a ring gear that interfaces with a gear coupled to the second intermediate shaft in the engaged condition of the second intermediate shaft and the mounted condition of the flange, such that rotation of the second intermediate shaft drives rotation of the ring gear, wherein a third bearing facilitates rotation of a portion of the differential, and wherein the flange houses the second bearing and the third bearing.

11. The transmission assembly of claim 10, wherein the ring gear is selectively coupled with the differential, such that the ring gear is operable to be removed from the transmission housing in the open position of the housing cover.

12. The transmission assembly of claim 10, wherein the ring gear and the intermediate shaft assembly are configured to rotate about respective parallel axes.

\* \* \* \* \*